United States Patent [19]
Hirose

[11] Patent Number: 5,877,484
[45] Date of Patent: Mar. 2, 1999

[54] AUTOMATIC TICKET-EXAMINING APPARATUS FOR COLLECTING WIRELESS TICKETS

[75] Inventor: Nagayoshi Hirose, Tokyo, Japan

[73] Assignee: Kabushiki Kaisha Toshiba, Kawasaki, Japan

[21] Appl. No.: 847,601

[22] Filed: Apr. 25, 1997

[30] Foreign Application Priority Data

Jun. 4, 1996 [JP] Japan .................................. 8-141728

[51] Int. Cl.⁶ ............................. G06F 17/00; G06K 5/00; G06K 15/00; G07B 15/02
[52] U.S. Cl. .......................... 235/382; 235/375; 235/380; 235/383; 235/384; 235/440
[58] Field of Search .................... 235/382, 380, 235/383, 384, 375, 440

[56] References Cited

U.S. PATENT DOCUMENTS 3,748,441  7/1973  Halpern ................................. 235/384
4,040,345  8/1977  Adams et al. ............................ 101/66
4,271,351  6/1981  Bloodworth ............................ 235/375
5,382,781  1/1995  Inoue ..................................... 235/384
5,397,883  3/1995  Miyashita ............................... 235/382
5,414,249  5/1995  Matsumoto ............................. 235/384
5,450,051  9/1995  Stromberg .............................. 235/384
5,557,516  9/1996  Hogan .................................... 235/380

Primary Examiner—Anita Pellman Gross
Assistant Examiner—Daniel St. Cyr
Attorney, Agent, or Firm—Finnegan, Henderson, Farabow, Garrett & Dunner, L.L.P.

[57] ABSTRACT

An automatic passenger gate of the present invention is adapted for both one time use wireless medium and repeat use wireless medium. The automatic passenger gate includes an antenna for receiving information stored on the wireless medium, an input port for accepting the wireless medium, a collecting portion for collecting the accepted wireless medium, an output port for returning the accepted wireless medium. The automatic passenger gate collects the accepted wireless medium in the collecting portion when the accepted medium is a one time use wireless medium and the passenger is allowed to pass said automatic passenger gate. The automatic passenger gate returns the accepted wireless medium from the output port when the accepted medium is a one time use wireless medium and the passenger is prohibited from passing said automatic passenger gate, and when the accepted wireless medium is a repeat use wireless medium.

19 Claims, 8 Drawing Sheets

AUTOMATIC TICKET-EXAMINING APPARATUS FOR COLLECTING WIRELESS TICKETS

BACKGROUND OF THE INVENTION

1. Field of the Invention

The present invention relates to an automatic ticket-examining apparatus, usually installed at the entrances and exits of stations for the traffic facilities, for processing wireless tickets.

2. Description of the Related Art

In recent railroads, automatic ticket-examining equipment has been installed in the entrances and exits in railway facilities to save labor in punching, examining, or collecting tickets at the gates.

When the passenger passes through the ticket gate for entering the station or transferring from the station, the automatic ticket-examining equipment transmits/receives the inspection information stored in the wireless cards as wireless tickets for wireless communication. The automatic ticket-examining equipment checks for the validity of the wireless cards on the basis of the inspection information. The automatic ticket-examining equipment allows the passenger to enter or leave the station if the wireless card is valid. The automatic ticket-examining equipment prohibits the passenger from entering or leaving the station if the wireless card is invalid. This conventional automatic ticket-examining equipment is shown in the U.S. Pat. No. 5,397,883 (Miyashita). The automatic ticket-examining equipment may transmit/receive the inspection information, stored in the wireless cards, by holding the wireless cards near an antenna portion located at the automatic ticket-examining equipment without any additional process by the passenger for ticket disposal services.

However, the manufacturing cost of the wireless card is high. Therefore a kind of ticket or card to be convertible to the wireless card are limited season pass or stored fare card, which are used repeatedly by individual using traffic.

When the passenger uses the wireless ticket as an ordinary ticket that needs collecting at the ticket, gate for exit, the automatic ticket-examining equipment allows the passenger to pass through the ticket gate by not, contacting with the automatic ticket-examining equipment. Therefore it is difficult to collect the wireless card as the ordinary ticket, which needs collecting at the ticket gate for exit of the railway.

SUMMARY OF THE INVENTION

It is an object of the present invention to provide an automatic ticket-examining apparatus for collecting one time use wireless tickets and for non-contact processing repeat use wireless tickets.

It is an object of the present invention to provide an automatic ticket-examining apparatus for checking information stored on the wireless medium and collecting one time use wireless medium and for returning repeat use wireless medium.

According to the present invention, there is provided an passenger gate for processing information stored in a wireless medium, comprising; first receiving means for receiving information stored in the wireless medium without contacting with the wireless medium; accepting means for accepting the wireless medium; second receiving means for receiving information stored in the wireless medium accepted by said accepting means; judging means for allowing the passenger to pass through said automatic passenger gate on the basis of the information received by said first and second receiving means; and collecting means for collecting the accepted wireless medium when said judging means allows the passenger to pass said automatic passenger gate.

According another aspect of the present invention, there is provided an automatic passenger gate for processing information stored on a wireless medium, the wireless medium being a one time use wireless medium or a repeat use wireless medium, comprising; receiving means for receiving information stored on the wireless medium; accepting means for accepting the wireless medium; first checking means for checking the information received by said receiving means to check whether to allow the passenger to pass said automatic passenger gate; second checking means for checking the type of the wireless medium accepted from said accepting means; collecting means for collecting the accepted wireless medium when the accepted wireless medium is a one time use wireless medium and said first checking means allows the passenger to pass said automatic passenger gate; and returning means for returning the accepted wireless medium when the accepted wireless medium is a one time use wireless medium and said first checking means prohibits the passenger from passing said automatic passenger gate, and when the accepted wireless medium is a repeat use wireless medium.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DESCRIPTION OF THE PREFERRED EMBODIMENT

Hereinafter, an embodiment of the present invention will be described, referring to the accompanying drawings.

Figure 1:
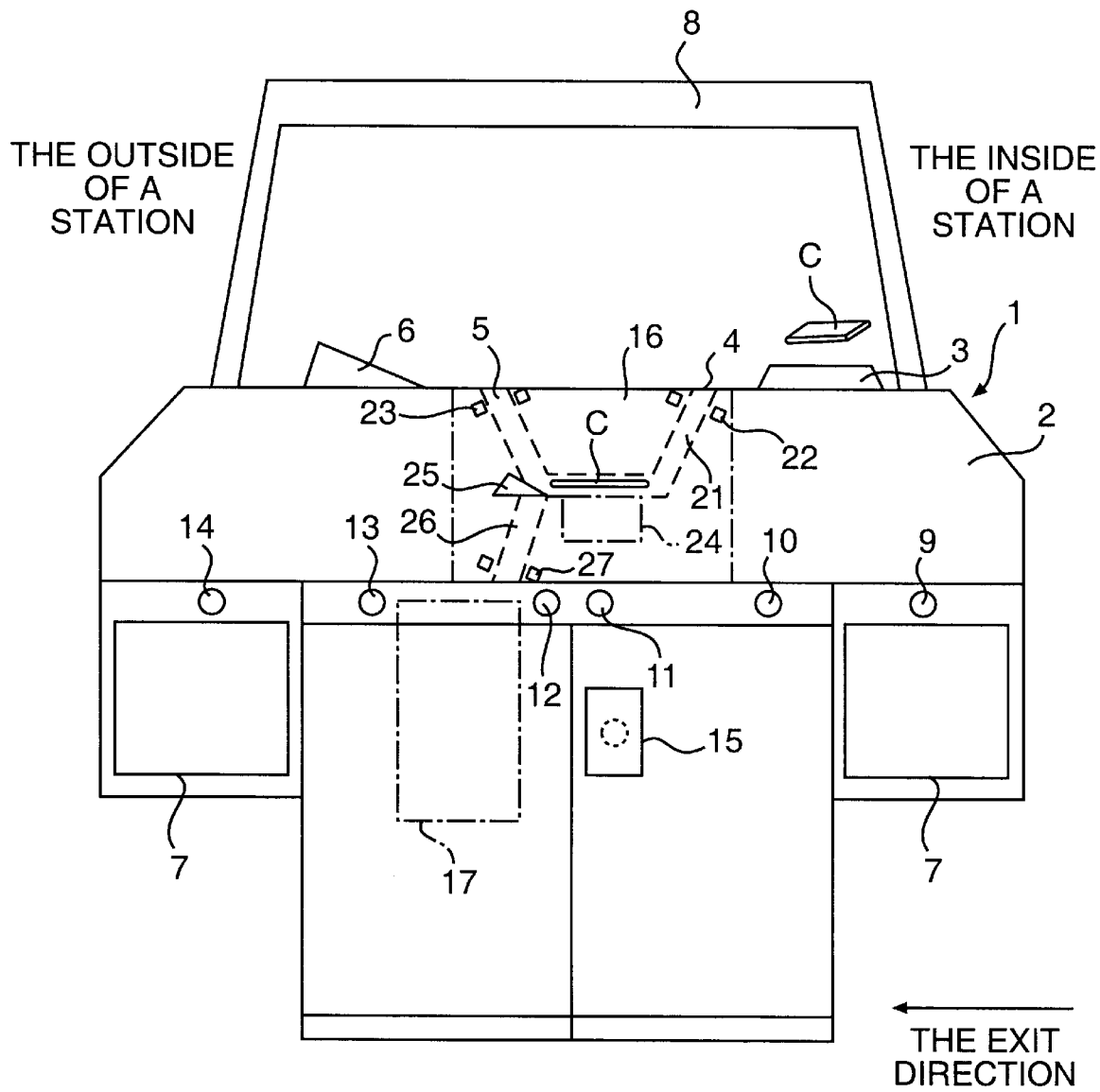
FIG. 1 is a schematic diagram showing the internal construction of an automatic ticket-examining apparatus according to one embodiment of the present invention.
Figure 2:
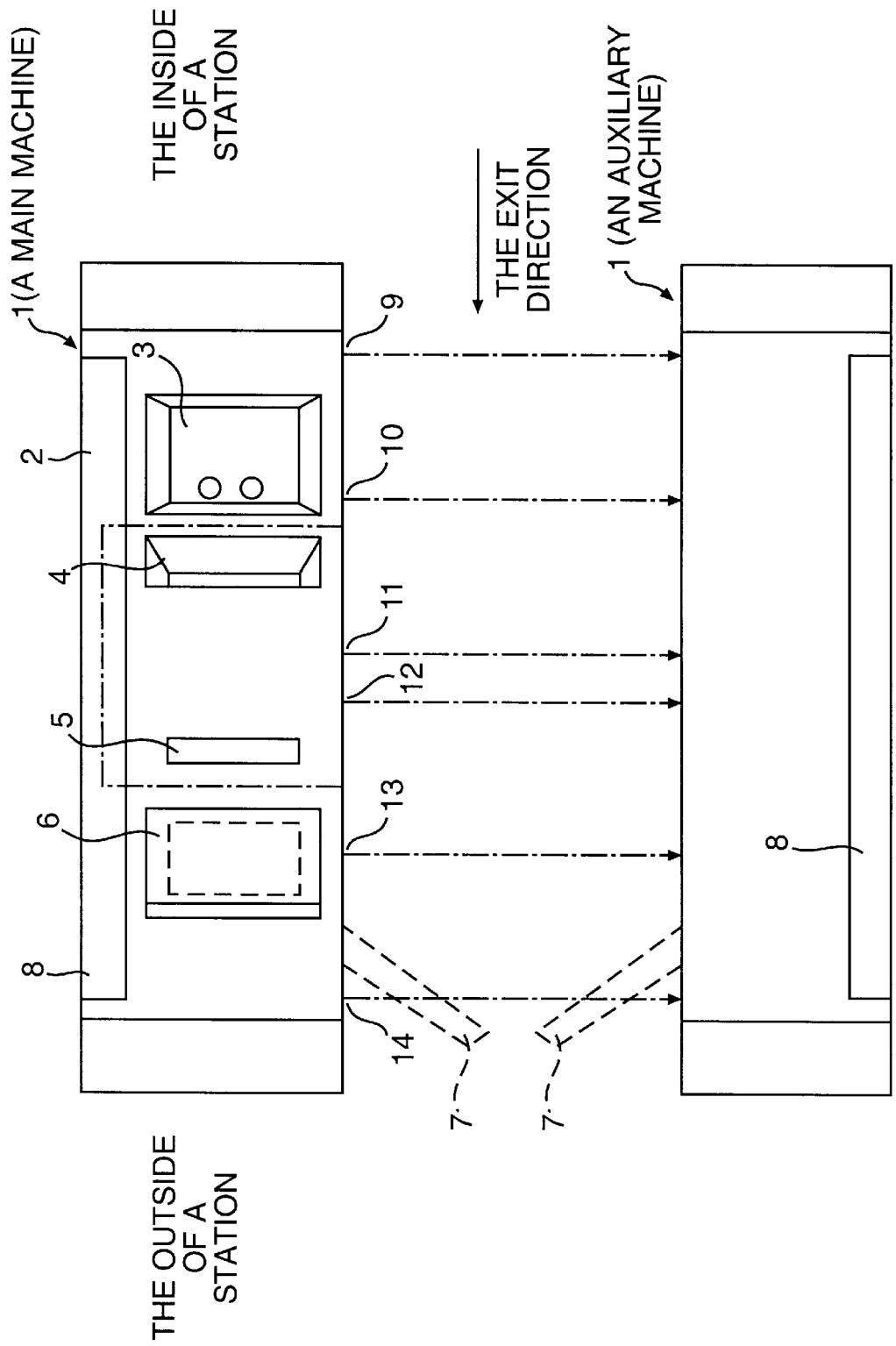
FIG. 2 is a schematic top view of the wireless card input/output port and the antenna section of the automatic ticket-examining apparatus according to the embodiment.

FIGS. 1 and 2 schematically show the internal construction of an automatic ticket-examining apparatus for exit 1 according to the present invention. The automatic ticket-examining apparatus 1 is installed in an exit of a station, and processes a wireless card C such as an ordinary ticket, a season ticket (commutation pass), a stored fare card (SF card), or a coupon card. The wireless card C used as an ordinary ticket is for one time use only, and must be collected at the ticket gate for exit. The wireless card C used as a season ticket, or a stored fare card is for repeated use and does not need collecting at the ticket gate for exit. The wireless card C used as a coupon card must be collected after using the predetermined effective amount.

Usually, a body 2 of an automatic ticket-examining apparatus 1 has a main machine and an auxiliary machine. The automatic ticket-examining apparatus 1 has an antenna 3 provided on one end part of the upper surface of the body 2. The antenna 3 receives the inspection information from the wireless card C and transmits the inspection information to the wireless card C.

The automatic ticket-examining apparatus 1 has a input port 4 provided on the area in front of the antenna 3. The input port 4 accepts the wireless card C. On the area in front of the input port 4, the automatic ticket-examining apparatus 1 has an output port 5. The output port 5 returns the wireless card C accepted from the input port 4.

The automatic ticket-examining apparatus 1 has a guide display 6 provided on the other end part of the upper surface of the body 2. The guide display 6 guides to a passenger or station staffs. The guide display 6 includes a plasma display. The main machine and the auxiliary machine have a pair of doors 7 provided on both end parts respectively. The doors 7 control passage of the passenger passing through the ticket gate. The automatic ticket-examining apparatus 1 controls opening or closing the pair of doors 7 on the basis of a result of the judgment of passage of a passenger.

The automatic ticket-examining apparatus 1 has a frame-shaped pole 8 to help the passenger to be aware of the passageway in the upper part of the body 2. The main machine and the auxiliary machine of the automatic ticket-examining apparatus 1 have a plurality of optical sensors provided on the side face respectively thereof. The optical sensors detect the passage of a passenger.

For example these optical sensors may include entrance detectors 9 and 10, middle detectors 11 and 12, and exit detectors 13 and 14. The entrance detectors 9 and 10 detect passengers who pass through the part of antenna 3 of the passageway. The middle detectors 11 and 12 detect passengers who pass through the middle part of the passageway. The exit detectors 13 and 14 detect passengers who pass through the part of the guide display 6 of the passageway.

The automatic ticket-examining apparatus 1 has a speaker 15 provided in the central part of the main machine. The speaker 15 announces the sound guide to the passenger. As shown in FIG. 1, the automatic ticket-examining apparatus 1 includes a wireless card processing unit 16 provided on a part, which is interposed between the input port 4 and the output port 5 in an opposite manner, of the inside of the main machine. The wireless card processing unit 16 communicates with the wireless card C accepted from the input port 4 for wireless. The wireless processing unit 16 has a collection box 17 provided in the lower part thereof. The collection box 17 collects the wireless card C.

The wireless card processing unit 16 includes a conveying passage 21 formed between the input port 4 and the output port 5. The conveying passage 21 transfers the wireless card C accepted from the input, port 4 to the output port 5. The conveying passage 21 has a conveying member, such as a conveying belt or conveying roller, which permits flexibly elastic member to sandwich the wireless card C. The conveying passage 21 may sandwich and convey the wireless card C, from less than 1 mm to a couple of centimeters in thickness, by the flexibly elastic member.

The wireless card processing unit 16 includes a detector 22 on the area near the input port 4 of the conveying passage 21, and a detector 23 on the area near the output port 5 of the conveying passage 21. Each of these detectors 22 and 23 includes the optical sensor comprising light source and light receiving element. When the wireless card C just passes between the light source and the light receiving element, the wireless card C interrupts the light of the light source. Each of these detectors 22 and 23 detects the wireless card C on taking advantage of the interruption of light. The detector 22 detects the wireless card C accepted into the input port 4. The detector 23 detects the wireless card C returned from the output port 5.

The wireless processing unit 16 has an antenna 24 provided on the conveying passage 21 between the input port 4 and the output port 5. The antenna 24 receives the inspection information from the wireless card C and transmits the inspection information to the wireless card C.

The wireless processing unit 16 has a distributing gate 25 provided on the conveying passage 21 between the antenna 24 and the output port 5. The distributing gate 25 controls distribution of the wireless card C. When the wireless card C accepted from the input port 4 does not need collecting, the distributing gate 25 distributes the wireless card C toward the output port 5. When the wireless card C accepted from the input port 4 needs collecting, the distributing gate 25 distributes the wireless card C toward the collection box 17. After the distributing gate 25 distributes the wireless card C toward the collection box 17, conveying passage for collection 26 conveys the distributed wireless card C to the collection box 17. The conveying passage for collection 26 has a detector 27 provided on the area near to the collection box 17. The detector 27 detects optically the wireless card C collected into the collection box 17.

Figure 3:
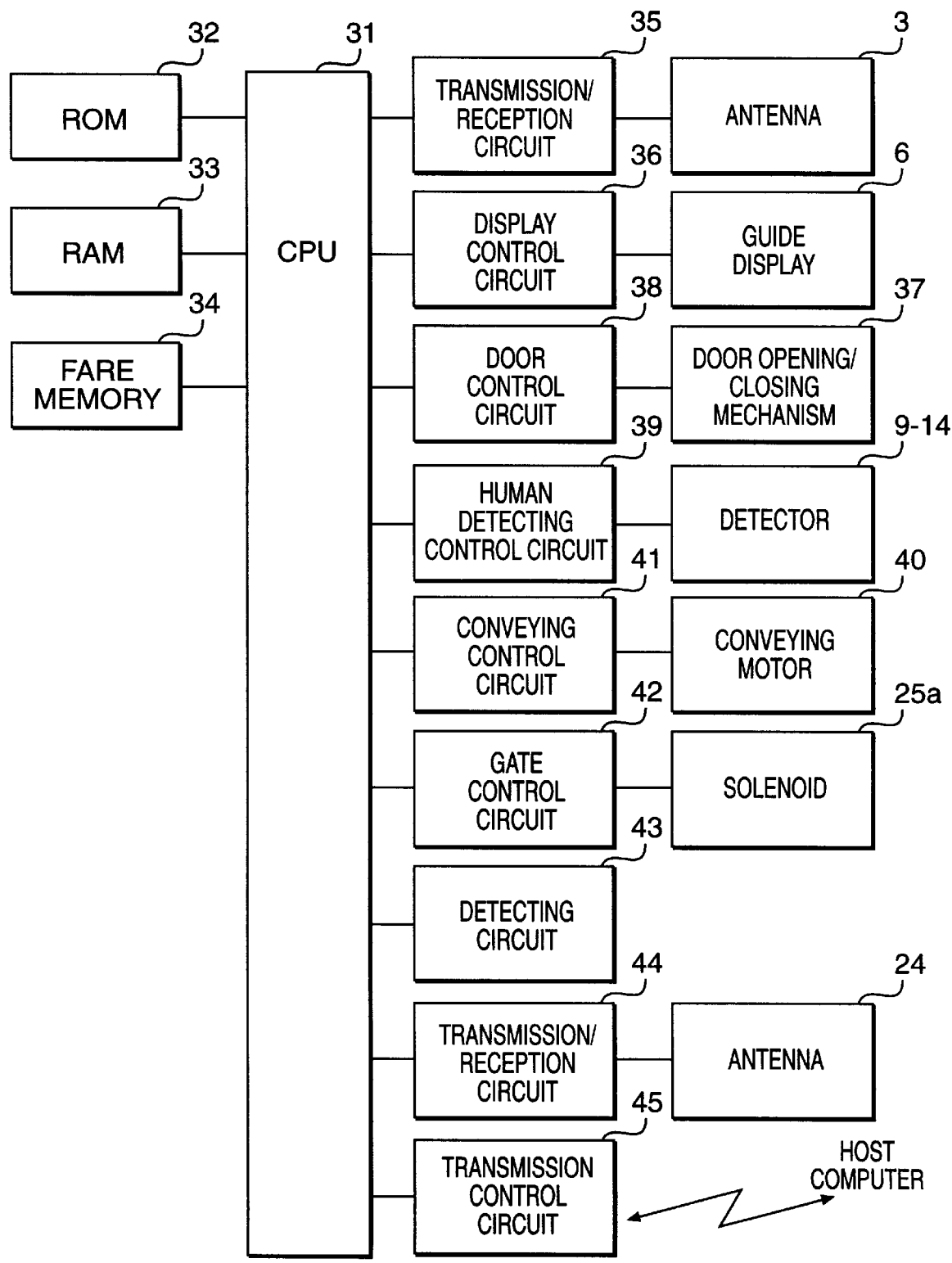
FIG. 3 is a block diagram of the control system of the automatic ticket-examining apparatus according to the embodiment.

FIG. 3 is a schematic block diagram of the control system of the automatic ticket-examining apparatus 1 of the above-identified construction.

The control system of the automatic ticket-examining apparatus 1 comprises: a central processing unit (hereinafter, referred to as a CPU) 31 for controlling the automatic ticket-examining apparatus 1; a read only memory (hereinafter, referred to as a ROM) 32 for storing a control program for the CPU 31, a reference data for judging inspection information of the wireless card C and data or code of the station in which the automatic ticket-examining apparatus 1 is installed; a random access memory (hereinafter, referred to as a RAM) 33 as means for storing the inspection information read out from the wireless card C and information acting as buffer for the control program; a fare memory 34 which stored the fare information correspondent to data or code of the station; a transmission/reception circuit 35 for controlling the communication of inspection information via a wireless antenna 3 with the wireless ticket C; a display control circuit 36 for controlling the guide display 6; a door control circuit 38 for controlling a door opening/closing mechanism 37 that actuates the door 7; a human detecting control circuit 39 for detecting situation of passing of the passenger on the basis of the output of the detectors 9, 10, 11, 12, 13, and 14; a conveying control circuit 41 for controlling a conveying motor 40 that actuated the conveying systems of the conveying passages 21 and 26 that convey the wireless card; a gate control circuit 42 for controlling a solenoid 25*a* that changes a distributing gate 25; a detecting circuit 43 for detecting situation of conveying the wireless card C on the basis of the output of the detectors 22, 23, 27; a transmission/reception circuit 44 for controlling the communication of inspection information via a wireless antenna 24 with the wireless card C; and a transmission control circuit 45 for intercommunicating information with host computer (not shown) for controlling the automatic ticket-examining apparatus 1.

The wireless card processing unit 16 comprises the conveying passages 21 and 26, the detectors 22, 23, and 27, the antenna 24, the distributing gate 25, the conveying motor 40, the conveying control circuit 41, gate control circuit 42, the detecting circuit 43, and transmission/reception circuit 44.

Figure 4:
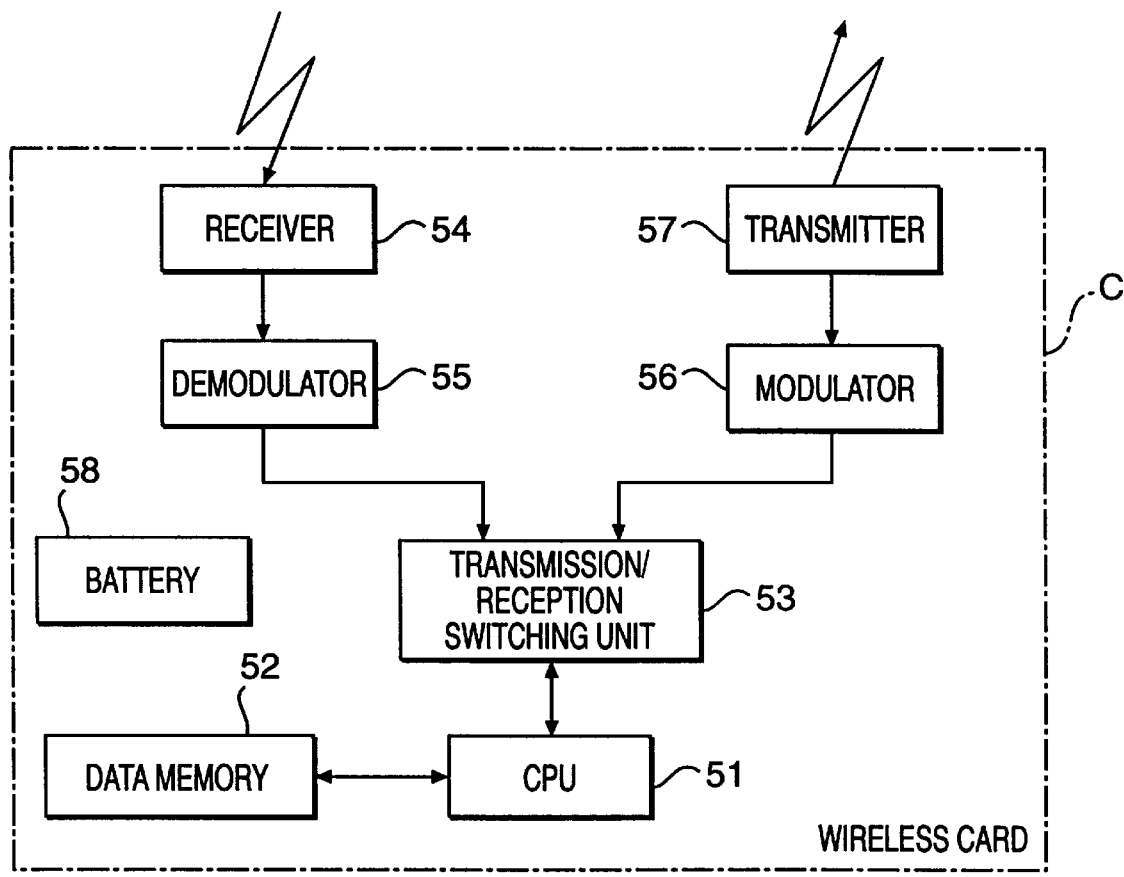
FIG. 4 is a block diagram of a wireless card for use in the automatic ticket-examining apparatus.

FIG. 4 is a block diagram of a wireless card. A wireless card C in the figure has a CPU 51 for controlling the wireless card C, a data memory 52 for storing a control program for the CPU 51 and inspection information, transmission/reception switching unit 53 for switching the transmitting or receiving communications, a receiver 54 for receiving a signal of the information from the automatic ticket-examining apparatus 1, a demodulator 55 for demodulating a signal received by the receiver 54, a modulator 56 for modulating the signal read out from the data memory 52, a transmitter 57 for transmitting wireless wave modulated by the modulator 56 to the automatic ticket-examining apparatus 1, and a battery 58 for supplying required power to each unit.

The inspection information, which is transmitted/received between the wireless card C and the automatic ticket-examining apparatus, includes for example name of issuing organization (name of company), information of kind of ticket, effective period, entry (riding) date and time, entry (riding) station, exit date and time, exit station, fare, issuing date, and usable time. The data memory 52 of the wireless card C records these contents of the inspection information, when each ticket is issued, or is received the inspection information from the automatic ticket-examining apparatus 1.

The data memory 52 of the wireless card C records, mainly, the name of issuing organization (name of company), number of issued ticket, information of kind of ticket, issuing date as the inspection information. The wireless card C as an ordinary ticket, additionally, records the inspection information further including the entry date and time, the entry station, the fare, or the exit information. The wireless card C as a season ticket, additionally, records the inspection information further including the effective period, the entry date and time, the entry station (exit date and time, exit station).

Each constituent element incorporated into the wireless card C as mentioned above forms one or a plurality of IC chip(s) disposed on the board. An entire shape of the wireless card C takes a form of a single card-like board. An automatic ticket-examining apparatus for entry may be similar to the automatic ticket-examining apparatus for exit. Furthermore, with the automatic ticket-examining apparatus for entry, installed in the place where the wireless card C does not need collection, the construction of apparatus without the wireless card unit may be also workable.

The entry operation of the automatic ticket-examining apparatus for entry gate 1 having the above-identified construction will be explained.

When the passenger presents the wireless card C to the area within which communications by the antenna 3 may be effective, then, the transmission/reception circuit 35 in the automatic ticket-examining apparatus 1 starts communication with the wireless card C via the antenna 3. The transmission/reception circuit 35 receives in turn the inspection information stored in the data memory 52 of the wireless card C and sends the received inspection information to the CPU 31.

Among items in the inspection information supplied to the CPU 31 from the transmission/reception circuit 35 in the automatic ticket-examining apparatus 1, the CPU 31 judges whether or not the name of issuing organization accords with that handled by the above automatic ticket-examining apparatus 1. On the basis of a result of the judgment as to the name of issuing organization in the inspection information, the CPU 31 judges effectiveness of the wireless card C. If judged effective, the CPU 31 transmits the entry information from the transmission/reception circuit 35 to the wireless card C via the antenna 3 so as to record the entry information including the entry date and time and the entry station onto the data memory 52 of the wireless card C.

At that time, CPU 31 judges the kind of ticket of the wireless card C on the basis of the inspection information transmitted from the wireless card C thereto. If the wireless card C is an ordinary ticket or a season ticket, the CPU 31 transmits the entry information comprising the entry date and time and the entry station to the wireless card C. If the wireless card C is a stored fare card, CPU 31 transmits remaining effective amount (balance) of the stored fare reduced by minimum section fare to the wireless card C in addition to the entry information. If the wireless card C is a coupon card, CPU 31 in turn transmits the usable time of the coupon card reduced by one time of use to the wireless card C in addition to the entry information.

The wireless card C commences to permit the receiver 54 to receive the entry information transmitted from the automatic ticket-examining apparatus 1. Then, if the wireless card C is an ordinary ticket or a season ticket, the CPU 51 writes the entry information comprising the entry date and time and the entry station onto the data memory 52. If the wireless card C is a stored fare card, CPU 51 writes the entry information onto the data memory 52 and renews the remaining effective amount. If the wireless card C is a coupon card, the CPU 51 in turn writes the entry information onto the data memory 52, and renews usable times received by the receiver 54.

If a result of the judgment shows that exchange of data with the wireless card C is valid in the automatic ticket-examining apparatus 1, the CPU 31 permits the door control circuit 38 to open the door 7, and allows the passenger to his passage. The automatic ticket-examining apparatus 1 returns to stand-by for the next presentation of a wireless card C.

When a processing of judging effectively of the wireless card C may treat the wireless card C as ineffective or invalid, the CPU 31 causes the door control circuit 38 to close the door 7, and prohibits the passenger from passing. Then the CPU 31 causes the display control circuit 36 to display the reason for closing the door on the guide display 6. Furthermore, on the basis of detecting signal of the detectors 9 to 14, the CPU 31 checks whether or not the passenger, prohibited from passing, gets out of the passageway by returning toward the side opposite to advancing direction. If a result of the checking shows that the passenger gets out of the passageway, the automatic ticket-examining apparatus 1 returns in turn to stand-by for the next presentation of the wireless card C.

Figure 5:
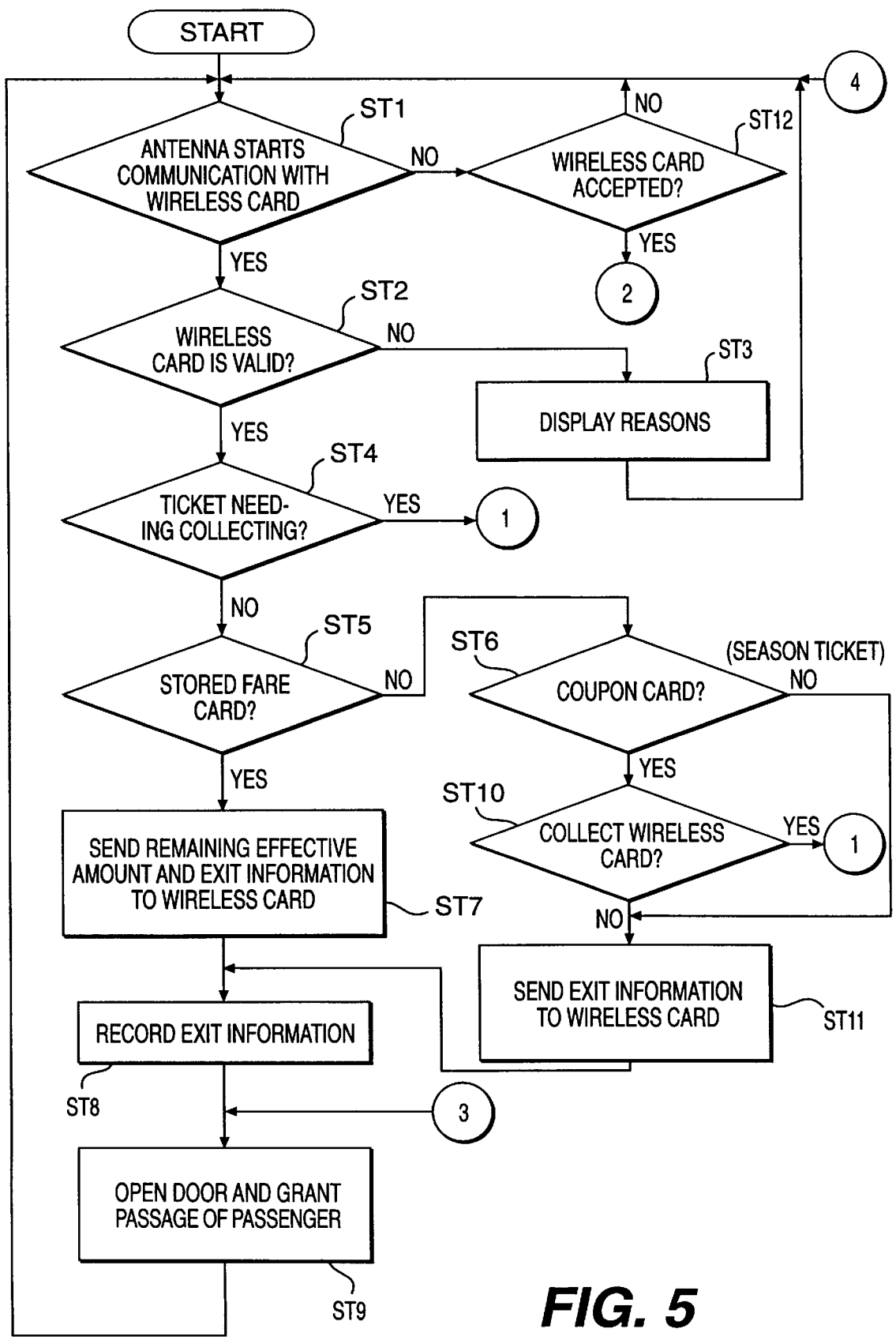
FIG. 5 is a flowchart for explaining a processing order of the wireless card of the automatic ticket-examining apparatus according to the embodiment.
Figure 6:
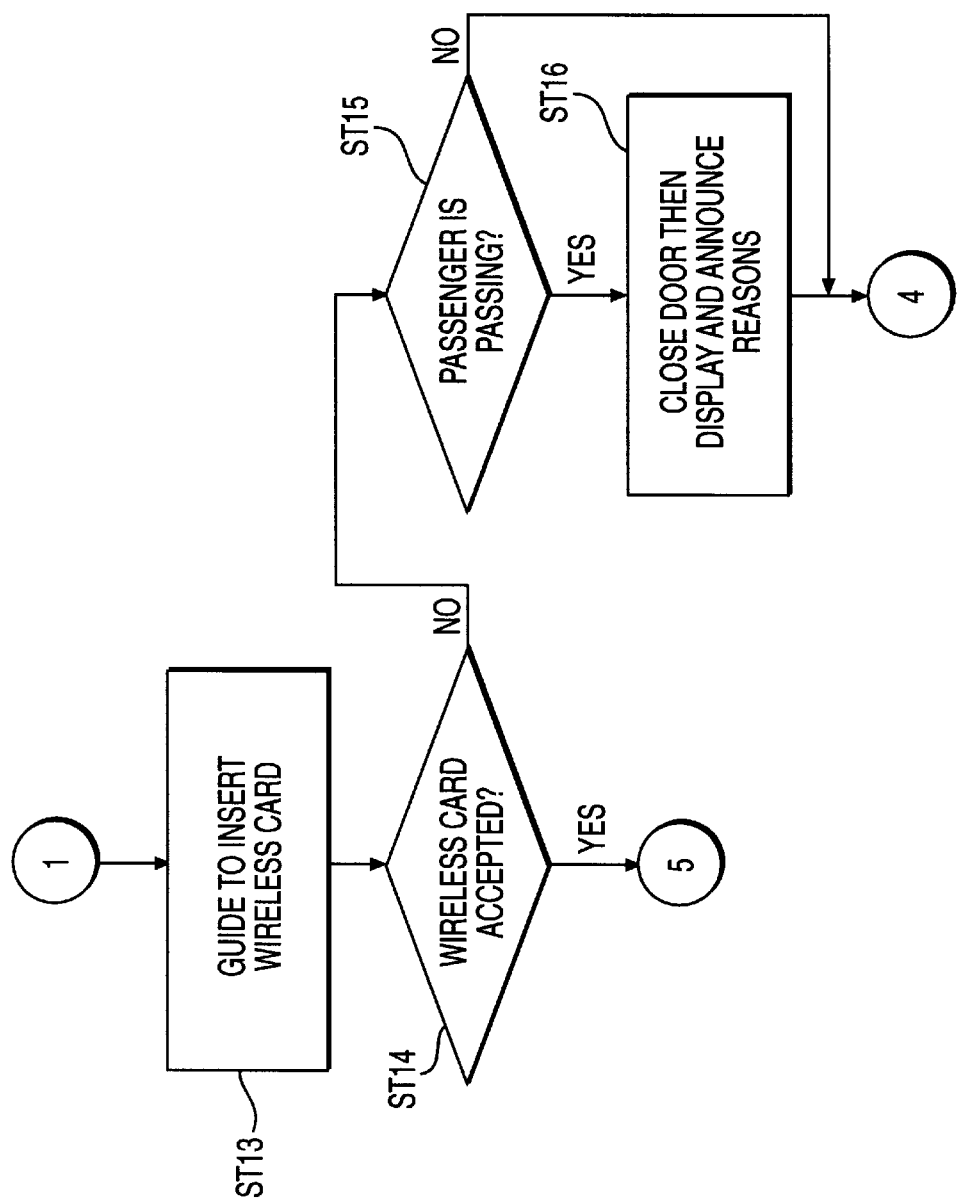
FIG. 6 is a flowchart for explaining a processing order of the wireless card of the automatic ticket-examining apparatus according to the embodiment.
Figure 7:
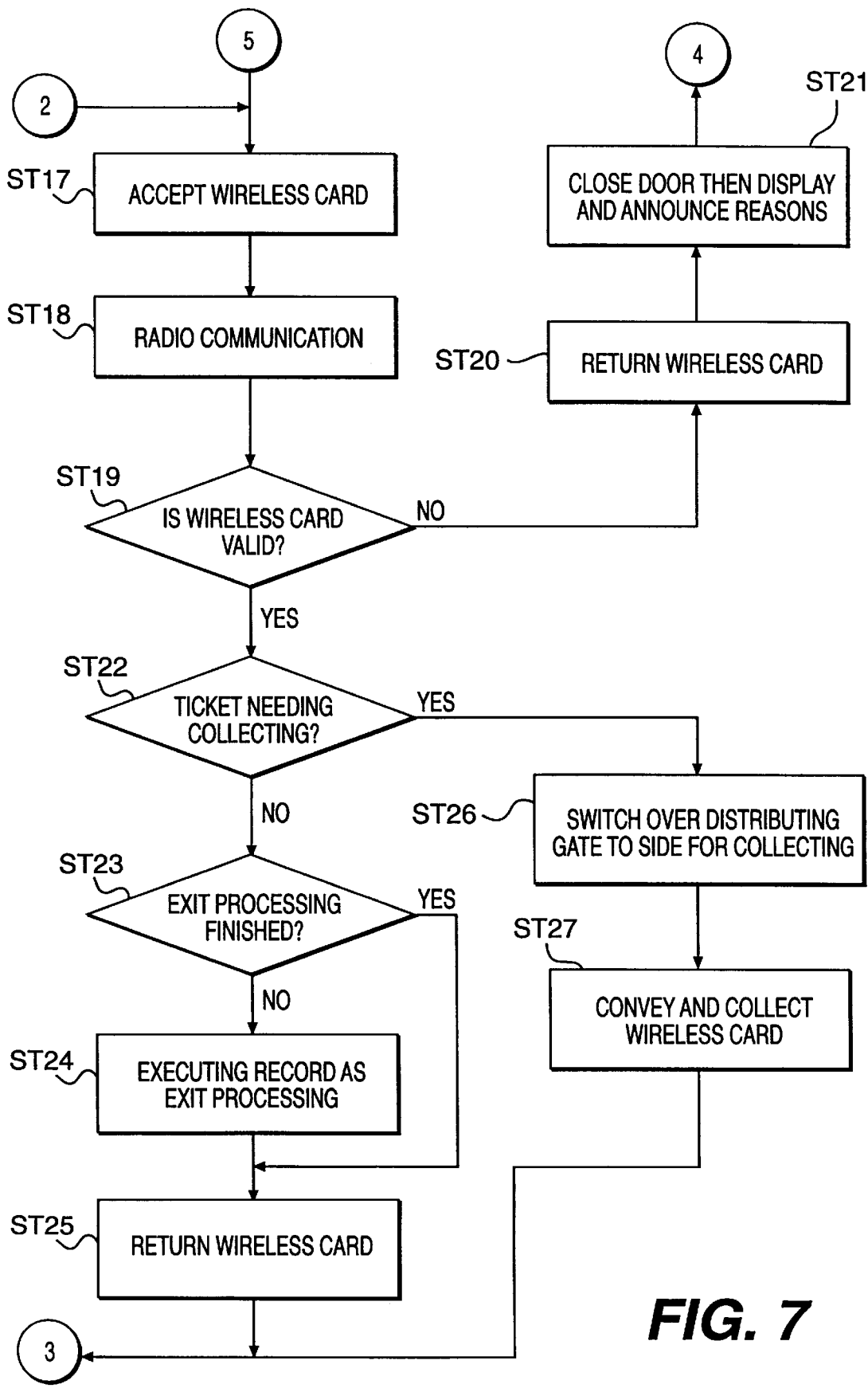
FIG. 7 is a flowchart for explaining a processing order of the wireless card of the automatic ticket-examining apparatus according to the embodiment.
Figure 8:
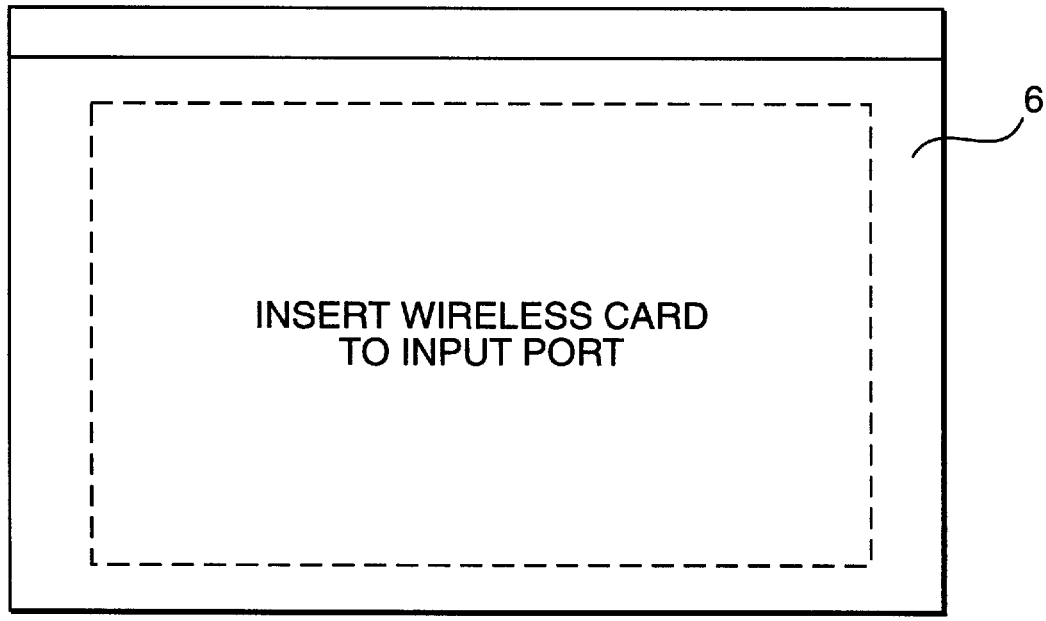
FIG. 8 is a top view showing a guidance displaying on the guide display of the automatic ticket-examining apparatus according to the embodiment.

The operation of the automatic ticket-examining apparatus 1 for exit of the above-mentioned construction will be explained in conjunction with flowcharts of FIGS. 5 and 8 as follows:

When the passenger presents the wireless card C to the area within which the communications by the antenna 3 may be effective, then, the transmission/reception circuit 35 in the automatic ticket-examining apparatus 1 starts communication with the wireless card C via the antenna 3. Transmission/reception circuit 35 receives in turn the inspection information stored in the data memory 52 of the wireless card C and sends the received inspection information to the CPU 31 (ST1).

The CPU 31 judges whether or not the wireless card C is valid on the basis of the inspection information supplied from the transmission/reception circuit 35 thereto (ST2). Namely, among items in the inspection information supplied to the CPU 31 from the transmission/reception circuit 35, the CPU 31 judges whether or not the name of issuing organization accords with that handled by the above automatic ticket-examining apparatus 1, whether or not the effective period includes the predetermined date, whether or not the effective section includes the predetermined station, whether or not the effective amount is more than the fare of minimum section, or whether the usable time are over "1" time or not.

When a result of the judgment at step 2 shows that the wireless card C is invalid, the CPU 31 causes the door control circuit 38 to close the door 7 and prohibits the passenger from passing. Then the CPU 31 causes the display control circuit 36 to display a reason for closing the door on the guide display 6 (ST 3).

Furthermore, on the basis of detecting signal of he detectors 9 to 14, the CPU 31 checks whether or not the passenger, prohibited from passing, gets out of the passageway by return. If a result of the checking shows that the passenger gets out of the passageway, the automatic ticket-examining apparatus 1 returns to stand-by for the next presentation of the wireless card C.

If a result of the judgment at step 2 shows that the wireless card C is valid, the CPU 31 judges whether or not the wireless card C requires collection at the exit as an ordinary ticket for one time use only, on the basis of the information of kind of ticket in the inspection information supplied from the transmission/reception circuit 35 to the CPU 31 (ST 4).

Similarly, the CPU 31 judges whether or not the wireless card C is a stored fare card (ST 5). The CPU 31 judges whether or not the wireless card C is a coupon card (ST 6).

When a result of the judgment shows that the wireless card C is the stored fare card at step 5, the CPU 31 reads out the fare corresponding to the entry information in the wireless card C from a fare memory 34 and reduces the stored fare by the minimum section fare. Then the CPU 31 reduces from remaining effective amount, already reduced by minimum section fare at entrance, by the fare reduced by the minimum section fare. The CPU 31 renews a remaining effective amount of the inspection information stored in RAM 33 to reduced remaining effective amount. The CPU 31 sends the renewed remaining effective amount and an exit information from the transmission/reception circuit 35 via the antenna 3 to the wireless card C (ST7).

If the wireless card C is a stored fare card, receiver 54 receives the remaining effective amount and the exit information both sent from the automatic ticket-examining apparatus 1. The CPU 51 renews the received remaining effective amount onto the data memory 52. Additionally, the CPU 51 records the exit information including the exit date and time and the exit station onto the data memory 52.

If a result of the judgment shows that, exchange of data with the wireless card C is valid in the automatic ticket-examining apparatus 1, the CPU 31 permits the door control circuit 38 to open the door 7 and allow the passenger to passing (ST9). Then, the automatic ticket-examining apparatus 1 returns to step 1 of processing, and to stand-by for the next presentation of the wireless card C.

If the wireless card C is a coupon card at the judgment of step 6, the CPU 31 checks whether or not the usable time of the inspection information of the wireless card C is "0". Then, the CPU 31 judges whether or not the wireless card C needs collecting on the basis of a result of the checking (ST10).

If the usable time of the wireless card C is "0" at the checking of step 10, the automatic ticket-examining apparatus 1 proceeds to step 13 of processing, which is explained shortly. If the usable time of the wireless card C is not "0" at the checking of step 10, the CPU 31 sends the exit information from the transmission/reception circuit 35 via the antenna 3 to the wireless card C (ST 11).

If the wireless card C is a coupon card, the receiver 54 receives the exit information sent from the automatic ticket-examining apparatus 1. The CPU 51 records the exit information including the exit date and time and the exit station onto the data memory 52.

If a result of the judgment shows that exchange of data with the wireless card C is valid in the automatic ticket-examining apparatus 1, the CPU 31 permits the door control circuit 38 to open the door 7 and allow the passenger to passing (ST9). Then, the automatic ticket-examining apparatus 1 returns to step 1 of processing, to stand-by for the next presentation of the wireless card C.

If the wireless card C is a season ticket at the judgment of step 6, the CPU 31 sends the exit information from the transmission/reception circuit 35 via the antenna 3 to the wireless card C (ST 11).

With the wireless card C as the season ticket, the receiver 54 receives the exit information sent from the automatic ticket-examining apparatus 1. Then the CPU 51 records the exit information including the exit date and time and the exit station onto the data memory 52.

If a result of the judgment shows that exchange of data with the wireless card C is valid in the automatic ticket-examining apparatus 1, the CPU 31 permits the door control circuit 38 to open the door 7 and allow the passenger to passing (ST9). Then, the automatic ticket-examining apparatus 1 returns to step 1 of processing, and to stand-by for the next presentation of the wireless card C.

At step 1, when the automatic ticket-examining apparatus 1 does not exchange a communication with the wireless card C, the CPU 31 judges whether or not the input port 4 accepted the wireless card C on the basis of the detecting signal from the detector 22 (ST12). If a result of the judgment at step 12 shows that the input port 4 accepted the wireless card C, the automatic ticket-examining apparatus 1 proceeds to step 17 of processing, which is explained shortly. If a result of the judgment at step 12 shows that the input port 4 does not accept the wireless card C, the automatic ticket-examining apparatus 1 returns to step 1 of processing, and to stand-by for next presentation of the wireless card C.

If result of the judgment shows that the wireless card C is such a ticket for needing collection as ordinary ticket at step 4 or step 10, the CPU 31 permits the display control circuit 36 to display a guidance to insert of wireless card C into input port 4 on the guide display 6 (ST13).

In response to the guide display at step 13, on the basis of the detecting signal from the detector 22, the CPU 31 judges whether or not the input port 4 accepted the wireless card C (ST14). When a result of the judgment at step 14 shows that the input port 4 does not accept the wireless card C, on the basis of detecting signal from the detectors 9 to 14, the CPU 31 judges a passage condition of the passenger (ST 15).

When a result of the judgment at step 20 shows that the passenger is passing through the middle part of the passageway, the CPU 31 permits the door control circuit 38 to close the door 7 and prohibits the passenger from passing. Then, the display control circuit 36 displays "Insert wireless card into input port" on the guide display 6 as a reason for closing the door 7 to offer a guidance to the passenger. Additionally, the CPU 31 permits the speaker 15 to announce the sound guide of the same message (ST 16).

In succession, on the basis of detection signal from the detectors 9 to 14, the automatic ticket-examining apparatus 1 checks whether or not the passenger, prohibited from passing, got-out from the passageway by return. If checked as got out, the automatic ticket-examining apparatus 1 returns to the stand-by for next presentation of the wireless card C.

If a result of the judgment at step 14 shows that the input port 4 accepted the wireless card C, the CPU 31 permits the conveying control circuit 41 to control the conveying motor 40 for drive. Subsequently, the conveying member, including the conveying belt or the conveying roller, surrounds the wireless card C. Then the conveying member conveys the wireless card C to position opposite to the antenna 24 of the wireless card processing unit 16 (ST 17).

When the wireless card C is presented to the area within which communication scope by the antenna 24 is effective, the transmission/reception circuit 44 communicates with the wireless card C via the antenna 24. Furthermore, the transmission/reception circuit 44 receives the inspection information stored in the data memory 52 of the wireless card C, and sends the received inspection information to the CPU 31 (ST 18).

The CPU 31 judges whether the wireless card C is valid or not on the basis of the inspection information supplied from the transmission/reception circuit 44 (ST 19). Namely, among items in the inspection information supplied to the CPU 31 from the transmission/reception circuit 35 in the automatic ticket-examining apparatus 1, the CPU 31 judges whether or not the name of issuing organization accords with that handled by the above automatic ticket-examining apparatus 1, whether or not the effective period includes the predetermined data, whether or not the effective section includes the predetermined station, whether or not the effective amount is more than the fare of minimum section, or whether the usable time is over "1" time or not.

When a result of the judgment at step 19 shows that the wireless card C is invalid, the CPU 31 permits the conveying control circuit 41 to control the conveying motor 40 for drive. The conveying member including the conveying belt or the conveying roller conveys further the accepted wireless card C and returns the wireless card C from output port 5 (ST 20).

Together with the return action of the wireless card C, the CPU 31 permits the door control circuit 38 to close the door 7 and prohibits the passenger from passing. Then, the CPU 31 permits the display control circuit 36 to display a guide of "Insert wireless card into input port." on the guide display 6 as a reason for closing the door. Similarly, the CPU 31 permits the speaker 15 to announce the sound guide of the same message with the message of the display 6 (ST 21).

Furthermore, on the basis of detecting signal from the detectors 9 to 14, the CPU 31 checks whether or not the passenger, prohibited from passing, got out of the passageway by return. If a result of the checking shows that the passenger got out of the passage, the automatic ticket-examining apparatus 1 returns to stand-by for next presentation of the wireless card C.

If a result of the judgment at step 19 shows that the wireless card C is valid, the CPU 31 judges whether the wireless card C is an ordinary ticket, or whether the wireless card requires collection such as a used coupon card on the basis of the information of kind of ticket and the usable time in the inspection information supplied from the transmission/reception circuit 44 to the CPU 31 (ST22).

If a result of the judgment at step 22 shows that the wireless card C is an ordinary ticket or a ticket requiring collection, the CPU 31 permits the gate control circuit 42 to control the solenoid 25a to switch over the distributing gate 25 to the side of the collection box 17 (ST 26).

Subsequently, the CPU 31 permits the distributing gate 25 to swing over the wireless card C. The conveying passage for collection 26 conveys the wireless card C further to the side of the collection box 17. The automatic ticket-examining apparatus 1 collects the wireless card C as the ticket requiring collection to the collection box 17 (ST 27).

If a result of the judgment at step 22 shows that the wireless card C is a season ticket, a stored fare card, or a coupon card whose usable time is still effective, the CPU 31 judges whether or not the exit processing services applicable to the accepted wireless card C have finished (ST 23).

If a result of the judgment at step 23 shows that the exit processing services applicable to the wireless card C have already finished, the CPU 31 permits the conveying control circuit 41 to control the conveying motor 40 for drive. As a result, the conveying member conveys further the accepted wireless card C to return it from output port 5 (ST 25).

Together with return action of the wireless card C, the CPU 31 permits the door control circuit 38 to open the door 7 and allows the passenger to proceed (ST 9). The automatic ticket-examinmng apparatus 1 returns to step 1 of processing, and to stand-by for the next presentation of the wireless card C.

If a result of the judgment at step 23 shows that the exit processing services, i.e. the record of the exit information, have not yet finished, the CPU 31 sends the exit information from the transmission/reception circuit 44 via the antenna 24 to the wireless card C. When the receiver 54 in the wireless card C receives the exit information sent from the automatic ticket-examining apparatus 1 thereto, the CPU 51 records the exit information such as exit date and time or exit station onto the data memory 52 (ST 24).

After the record of the exit information to the wireless card at step 24, the CPU 31 permits the conveying control circuit 41 to control the conveying motor 40 for drive. The conveying member conveys further the accepted wireless card C and returns it from the output port 5 (ST 25).

Approximately at the same time of the return action of the wireless card C, the CPU 31 permits the door control circuit 38 to open the door 7 and allows the passenger to proceed (ST 9). The automatic ticket-examining apparatus 1 returns to step 1 of processing, and to stand-by for the next presentation of the wireless card C.

The above-mentioned embodiment contains a description of the case where the opening and closing mode of the door is constantly under the closing condition. The description puts its emphasis upon the case where only when the wireless card C is valid, the door opens to allows the passenger to proceed and the door closes after his passage. Similar processing also applies when the opening and closing mode of the door is constantly under the opening condition.

It is possible that similar processing also applies only when the wireless card is invalid, the door is disposed to be closed to prohibit the passenger from proceeding, and when no detection of the passenger is found in the passage, the door opens.

According to the above-mentioned embodiment, the processing applicable to the automatic ticket-examining apparatus used at the present site is also true of the ticketing processing services at exit which may be adaptable to the wireless card C used as a season ticket or a stored fare card without being collected at exit. Namely, by holding the wireless card C as the season ticket or the stored fare card to the antenna 3 by the passenger, the CPU 31 of the automatic ticket-examining apparatus 1 communicates with the wireless card C for wireless. After re-writing the predetermined information in the wireless card C, an automatic ticket-examining apparatus opens the door and allows passenger to pass for the passage. That suggests the same processing as used for the conventional automatic ticket-examining apparatus.

As described in detail, according to the present invention, it is possible to provide the automatic ticket-examining apparatus for collecting the one time use wireless card or ticket and for processing the repeat use wireless card or ticket without contacting the card or ticket.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claims is:

1. An automatic passenger gate for processing information stored in a wireless medium, comprising;
   first receiving means for receiving information stored in the wireless medium without contacting with the wireless medium;
   accepting means for accepting the wireless medium;
   second receiving means for receiving information stored in the wireless medium accepted by said accepting means;
   judging means for allowing the passenger to pass said automatic passenger gate on the basis of the information received by said first and second receiving means; and
   collecting means for collecting the accepted wireless medium when said judging means allows the passenger to pass said automatic passenger gate.

2. An automatic passenger gate according to claim 1, further comprising returning means for returning the accepted wireless medium when said judging means prohibits the passenger from passing said automatic passenger gate.

3. An automatic passenger gate for processing information stored on a wireless medium, the wireless medium being a one time use wireless medium or a repeat use wireless medium, comprising;
   receiving means for receiving information stored on the wireless medium;
   accepting means for accepting the wireless medium;
   first checking means for checking the information received by said receiving means to check whether to allow the passenger to pass said automatic passenger gate;
   second checking means for checking the type of the wireless medium accepted from said accepting means;
   collecting means for collecting the accepted wireless medium when the accepted wireless medium is a one time use wireless medium and said first checking means allows the passenger to pass said automatic passenger gate; and
   returning means for returning the accepted wireless medium when the accepted wireless medium is a one time use wireless medium and said first checking means prohibits the passenger from passing said automatic passenger gate, and when the accepted wireless medium is a repeat use wireless medium.

4. An automatic passenger gate according to claim 3, wherein said receiving means includes first receiving means for receiving the information stored on the wireless medium held by the passenger, and second receiving means for receiving the information stored on the wireless medium accepted from said accepting means.

5. An automatic passenger gate according to claim 4, wherein each of said first and second receiving means includes an antenna for receiving the information stored on the wireless medium without contacting the wireless medium.

6. An automatic passenger gate according to claim 3, further comprising distributing means for distributing the accepted wireless medium to said collecting means when the accepted wireless medium is a one time use wireless medium and said first checking means allows the passenger to pass said automatic passenger gate, and for distributing the accepted wireless medium to said returning means when the accepted wireless medium is a one time use wireless medium and said first checking means prohibits the passenger from passing said automatic passenger gate, and when the accepted wireless medium is a repeat use wireless medium.

7. An automatic passenger gate according to claim 3, further comprising guiding means for guiding the passenger to insert the wireless medium in said accepting means.

8. An automatic passenger gate for processing information stored on a wireless medium, the wireless medium being a one time use wireless medium or a repeat use wireless medium, comprising;
   receiving means for receiving information stored on the wireless medium;
   first checking means for checking the information received by said receiving means to check the type of the wireless medium;
   guiding means for guiding the passenger to insert the wireless medium when the wireless medium is a one time use wireless medium;
   accepting means for accepting the wireless medium;
   second checking means for checking the information received by said receiving means to check whether to allow the passenger to pass said automatic passenger gate;
   third checking means for checking the type of the wireless medium accepted from said accepting means;
   collecting means for collecting the accepted wireless medium when the accepted wireless medium is a one time use wireless medium and said second checking means allows the passenger to pass said automatic passenger gate; and
   returning means for returning the accepted wireless medium when the accepted wireless medium is a one time use wireless medium and said second checking means prohibits the passenger from passing said automatic passenger gate, and when the accepted wireless medium is a repeat use wireless medium.

9. An automatic passenger gate according to claim 8, wherein said receiving means includes first receiving means for receiving the information stored on the wireless medium held by the passenger, and second receiving means for receiving the information stored on the wireless medium accepted from said accepting means.

10. An automatic passenger gate according to claim 9, wherein each of said first and second receiving means includes an antenna receiving the information stored on the wireless medium without contacting the wireless medium.

11. An automatic passenger gate according to claim 8, further comprising distributing means for distributing the accepted wireless medium to said collecting means when the accepted wireless medium is a one time use wireless medium and said second checking means allows the passenger to pass said automatic passenger gate, and for distributing the accepted wireless medium to said returning means when the accepted wireless medium is a one time use wireless medium and said second checking means prohibits the passenger from passing said automatic passenger gate, and when the accepted wireless medium is a repeat use wireless medium.

12. An automatic passenger gate according to claim 8, further comprising detecting means for detecting the passenger passing said automatic passenger gate; and prohibiting means for prohibiting the passenger from passing said automatic passenger gate when said detecting means detects the passenger passing said automatic passenger gate, the wireless medium is a one time use wireless medium, and said accepting means does not accept the wireless medium.

13. An automatic passenger gate according to claim 12, wherein guiding means includes first guiding means for guiding the passenger to insert the wireless medium when the wireless medium is a one time use wireless medium as a result by said first checking, and second guiding means for guiding the passenger to insert the wireless medium when said prohibiting means prohibits the passenger from passing said automatic passenger gate.

14. An automatic passenger gate for processing information stored on a wireless medium, the wireless medium being a one time use wireless medium or a repeat use wireless medium, comprising;

first receiving means for receiving information stored on the wireless medium without contacting the wireless medium;

first checking means for checking the information received by said first receiving means to check whether to allow the passenger to pass said automatic passenger gate;

first transmitting means for transmitting permission to pass said automatic passenger gate to the wireless medium when said first checking means allows the passenger to pass said automatic passenger gate;

accepting means for accepting the wireless medium;

second receiving means for receiving information stored on the wireless medium accepted from said accepting means;

second checking means for checking the information received by said second receiving means to check the accepted wireless medium to have the permission;

third checking means for checking the information received by said second receiving means to check whether to allow the passenger to pass said automatic passenger gate when the accepted wireless medium does not have the permission;

fourth checking means for checking the type of the wireless medium accepted from said accepting means;

second transmitting means for transmitting permission to pass said automatic passenger gate to the accepted wireless medium when said third checking means allows the passenger to pass said automatic passenger gate and the accepted wireless medium is a repeat use wireless medium;

collecting means for collecting the accepted wireless medium when the accepted wireless medium is a one time use wireless medium and one of said first and third checking means allows the passenger to pass said automatic passenger gate; and returning means for returning the accepted wireless medium when the accepted wireless medium is a one time use wireless medium and one of said first and third checking means prohibits the passenger from passing said automatic passenger gate, and when the accepted wireless medium is a repeat use wireless medium.

15. An automatic passenger gate according to claim 14, further comprising fifth checking means for checking the information received by said first receiving means to check the type of the wireless medium; and guiding means for guiding the passenger to insert the wireless medium when the wireless medium is a repeat use wireless medium.

16. An automatic passenger gate according to claim 15, further comprising detecting means for detecting the passenger passing said automatic passenger gate; and prohibiting means for prohibiting the passenger from passing said automatic passenger gate when said detecting means detects the passenger passing said automatic passenger gate, the wireless medium is a one time use wireless medium and said accepting means does not accept the wireless medium.

17. An automatic passenger gate according to claim 14, further comprising distributing means for distributing the accepted wireless medium to said collecting means when the accepted wireless medium is a one time use wireless medium and one of said first and third checking means allows the passenger to pass said automatic passenger gate.

18. An automatic passenger gate for processing information stored on a wireless medium, the wireless medium being a one time use wireless medium or a repeat use wireless medium, comprising;

a wireless receiver for receiving the information stored on the wireless medium;

an input slot for accepting the wireless medium;

a collecting box for collecting a one time use wireless medium accepted by said input slot when the passenger is allowed to pass said automatic passenger gate;

an output slot for returning the accepted wireless medium when the accepted medium is a one time use wireless medium and the passenger is prohibited from passing said automatic passenger gate, and when the accepted wireless medium is a repeat use wireless medium; and a door for allowing the passenger to pass said automatic passenger gate by opening when passenger is not prohibited from passing said automatic passenger gate, and for prohibiting the passenger from passing said automatic passenger gate by closing.

19. An automatic passenger gate according to claim 18, further comprising a display for displaying guidance to insert the wireless medium to the passenger when the wireless medium is a one time use wireless medium.

* * * * *